United States Patent
Kwon

(10) Patent No.: US 6,246,445 B1
(45) Date of Patent: Jun. 12, 2001

(54) BRIGHTNESS CORRECTING CIRCUIT AND METHOD FOR EFFICIENTLY CORRECTING BRIGHTNESS AT EDGE AND CORNER OF MONITOR SCREEN

(75) Inventor: Hyeok-chul Kwon, Osan (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/313,486

(22) Filed: May 17, 1999

(30) Foreign Application Priority Data

Aug. 4, 1998 (KR) .................................................. 98-31703

(51) Int. Cl.$^7$ ............................... H04N 3/23; H04N 3/26; H04N 5/57
(52) U.S. Cl. .......................... 348/687; 348/687; 348/688; 348/745; 348/746; 348/806
(58) Field of Search ...................................... 348/687, 745, 348/746, 806, 688; H04N 3/23, 3/26, 5/57

(56) References Cited

U.S. PATENT DOCUMENTS

| | | | |
|---|---|---|---|
| 4,701,788 | * 10/1987 | Desjardins | 358/64 |
| 4,916,365 | * 4/1990 | Arai | 315/383 |
| 5,298,985 | * 3/1994 | Tsujihara et al. | 348/745 |
| 5,519,447 | * 5/1996 | Shima et al. | 348/556 |
| 5,523,657 | * 6/1996 | Kamei | 315/368 |
| 5,532,765 | * 7/1996 | Inoue et al. | 348/807 |
| 5,576,774 | * 11/1996 | Hosoi | 348/745 |
| 5,847,777 | * 12/1998 | George | 348/746 |
| 5,886,750 | * 3/1999 | Osuga et al. | 348/615 |

\* cited by examiner

Primary Examiner—Reinhard J. Eisenzopf
Assistant Examiner—Paulos Natnael
(74) Attorney, Agent, or Firm—Mills & Onello LLP

(57) ABSTRACT

A brightness correcting circuit and method for efficiently correcting the brightness of the edges and the corners of a monitor screen are provided. The circuit for correcting the brightness of the monitor screen which operates according to the brightness correcting method includes a parabolic signal generator for generating a parabolic signal and a corrected video signal generator for controlling the gain of an input video signal in response to the parabolic signal and outputting a corrected video signal. The parabolic signal generator includes a horizontal parabolic signal generator for generating a horizontal parabolic signal, the waveform of which is variable in response to a plurality of control signals, using a horizontal flyback pulse as an input, a vertical parabolic signal generator for generating a vertical parabolic signal, the waveform of which is variable in response to other plurality of control signals, using a vertical flyback pulse as an input, and an adder for adding the horizontal parabolic signal to the vertical parabolic signal and outputting the addition result as the parabolic signal. It is possible to efficiently correct the brightness of the edges and the corners of the screen by varying the waveform of the parabolic signal by selectively controlling the control signals of the horizontal parabolic signal generator and the vertical parabolic signal generator.

35 Claims, 9 Drawing Sheets

(*DARKNESS ≪ BRIGHTNESS)

(*DARKNESS ≪ BRIGHTNESS)

BRIGHTNESS CORRECTING CIRCUIT AND METHOD FOR EFFICIENTLY CORRECTING BRIGHTNESS AT EDGE AND CORNER OF MONITOR SCREEN

BACKGROUND OF THE INVENTION

1. Field of the Invention

The present invention relates to a monitor, and more particularly, to a brightness correcting circuit for correcting the brightness of a monitor screen and a brightness correcting method using the same.

2. Description of the Related Art

To produce an image on a monitor screen, a video signal is scanned to the screen via an electron gun. The video signal indicates a "black level" constant direct current (DC) voltage which controls the brightness of the screen. Since different users generally desire different brightnesses of the screen, monitors are constructed so that a user can change the brightness of the screen. As the size of a monitor screen becomes larger, the surface of the screen becomes generally non-spherical, i.e., it approaches a curved surface close to a planar surface.

As an example, a schematic diagram of a picture tube is shown in FIG. 1. Referring to FIG. 1, an electron gun 110 creates an electron beam using a video signal Vout as an input and reproduces an image on a screen 130 by controlling the intensity of the electron beam. When the screen 130 is non-spherical, a distance from the electron gun 110 to the screen 130 is not uniform. Namely, a distance 11 or 13 from the electron gun 110 to the edge of the screen 130 is greater than the distance 12 from the electron gun 110 to the center of the screen 130.

Accordingly, in a conventional monitor, the brightness at the edge of the screen 130 is generally lower than that at the center. In particular, the brightness is most greatly reduced in the corners of the screen.

SUMMARY OF THE INVENTION

To solve the above problems, it is an objective of the present invention to provide a brightness correcting circuit by which it is possible to efficiently correct the brightness at the edge and corners of a monitor screen.

It is another objective of the present invention to provide a parabolic signal generator for generating a parabolic signal, the waveform of which is variable in order to be used for the brightness correcting circuit.

It is still another objective of the present invention to provide a brightness correcting method for efficiently correcting the brightness at the edge and corners of the monitor screen.

Accordingly, to achieve the first and second objectives, there is provided a circuit for correcting the brightness of a monitor screen, comprising a parabolic signal generator for generating a parabolic signal and a corrected video signal generator for controlling the gain of an input video signal in response to the parabolic signal and outputting a corrected video signal.

The parabolic signal generator comprises a horizontal parabolic signal generator, a vertical parabolic signal generator, and an adder. The horizontal parabolic signal generator generates a horizontal parabolic signal, the waveform of which is variable in response to a plurality of control signals, using a horizontal flyback pulse as an input. The vertical parabolic signal generator generates a vertical parabolic signal, the waveform of which is variable in response to other plurality of control signals, using a vertical flyback pulse as an input. The adder adds the horizontal parabolic signal to the vertical parabolic signal and outputs the addition result as the parabolic signal.

According to a preferred embodiment, the horizontal parabolic signal generator comprises a sawtooth generator for generating a first sawtooth signal, using the horizontal flyback pulse as an input. The horizontal parabolic signal generator also includes a multiplier for generating the square signal and the fourth power signal of the first sawtooth, using the first sawtooth as an input. A level controller controls the levels of the first sawtooth, the square signal, and the fourth power signal in response to the plurality of control signals and outputs the signals with controlled levels. An adder adds the level-controlled first sawtooth signal, the level-controlled square signal, and the level-controlled fourth power signal to one another and outputs the addition result as the horizontal parabolic signal.

According to another preferred embodiment, the vertical parabolic signal generator comprises a sawtooth generator for generating a second sawtooth signal, using the vertical flyback pulse as an input. The vertical parabolic signal generator also includes a multiplier for generating the square signal and the fourth power signal of the second sawtooth, using the second sawtooth as an input. A level controller controls the levels of the second sawtooth, the square signal of the second sawtooth, and the fourth power of the second sawtooth in response to the other plurality of control signals and outputs the level-controlled signals. An adder adds the level-controlled second sawtooth signal, the level-controlled square signal, and the level-controlled fourth power signal to one another and outputs the addition result as the vertical parabolic signal.

To achieve the third objective, there is provided a method for correcting the brightness of a monitor screen. The method includes generating a horizontal parabolic signal with a variable waveform and generating a vertical parabolic signal with a variable waveform. The horizontal parabolic signal is added to the vertical parabolic signal and the addition result is output as the parabolic signal. The gain of an input video signal is controlled in response to the parabolic signal and a corrected video signal is output.

According to a preferred embodiment, the step of generating the horizontal parabolic signal comprises the steps of (a) generating a first sawtooth signal using a horizontal flyback pulse as an input, (b) generating the square signal and the fourth power signal of the first sawtooth signal using the first sawtooth signal as an input, (c) controlling the levels of the first sawtooth signal, the square signal of the first sawtooth signal, and the fourth power signal of the first sawtooth signal in response to a plurality of control signals, and (d) adding the first sawtooth signal, the square signal of the first sawtooth signal, and the fourth power signal of the first sawtooth signal, the levels of which are controlled, to each other and outputting the result as a horizontal parabolic signal.

According to another preferred embodiment, the step of generating the vertical parabolic signal comprises the steps of (e) generating a second sawtooth signal using a vertical flyback pulse as an input, (f) generating the square signal and the fourth power signal of the second sawtooth signal using the second sawtooth signal as an input, (g) controlling the levels of the second sawtooth signal, the square signal of the second sawtooth signal, and the fourth power signal of the second sawtooth signal in response to other plurality of control signals, and (h) adding the second sawtooth signal, the square signal of the second sawtooth signal, and the fourth power signal of the second sawtooth signal, the levels of which are controlled, to one another and outputting the addition result as a vertical parabolic signal.

According to the circuit for correcting the brightness of the monitor screen according to the present invention and the brightness correcting method of the present invention, it is possible to efficiently correct the brightness at the edge and the corner of the monitor screen by varying the waveform of the parabolic signal by selectively controlling the control signals of the horizontal parabolic signal generator and the vertical parabolic signal generator.

BRIEF DESCRIPTION OF THE DRAWINGS

The foregoing and other objects, features, and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DESCRIPTION OF THE PREFERRED EMBODIMENTS

Hereinafter, the structure and operation of a brightness correcting circuit according to the present invention and a brightness correcting method performed in the circuit will be described in detail with reference to the attached drawings.

Figure 1:
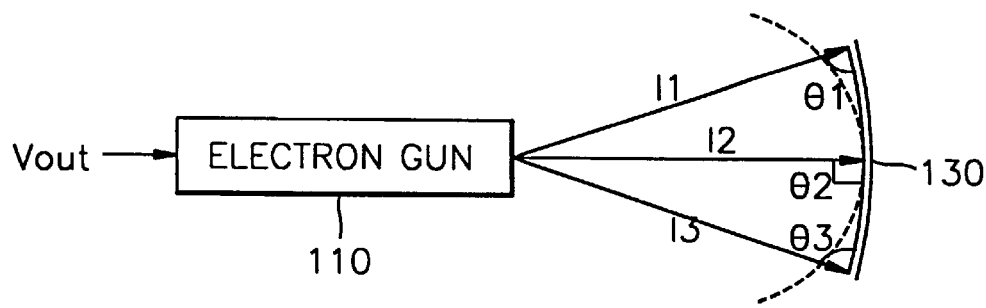
FIG. 1 is a schematic diagram of a monitor picture tube.
Figure 2:
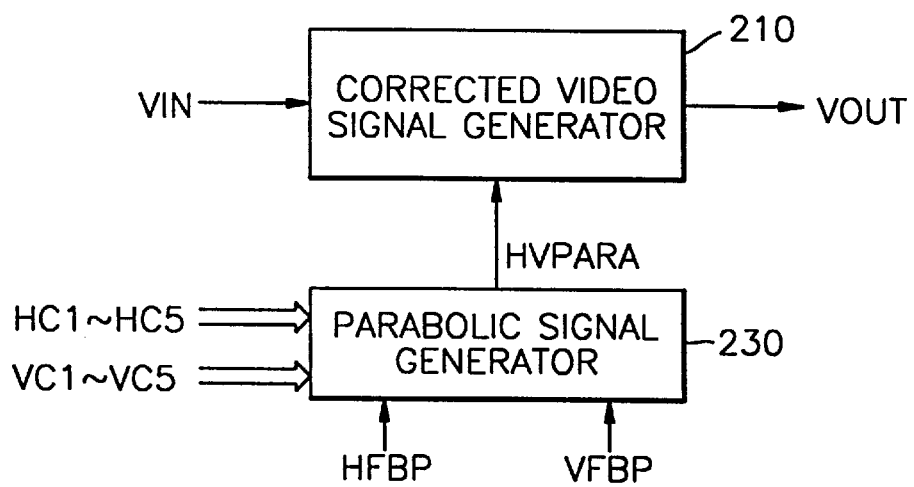
FIG. 2 is a block diagram of one embodiment of a brightness correcting circuit of a monitor screen according to the present invention.

Referring to FIG. 2, in one embodiment, the brightness correcting circuit according to the present invention includes a parabolic signal generator 230 and a corrected video signal generator 210. The parabolic signal generator 230 generates a parabolic signal (HVPARA), the waveform of which is variable in response to a plurality of control signals HC1 through HC5 and VC1 through VC5, using a horizontal flyback pulse (HFBP) and a vertical flyback pulse (VFBP) as inputs. The corrected video signal generator 210 including an amplifier corrects the gain of an input video signal (VIN) in response to the parabolic signal (HVPARA) and outputs a corrected video signal (VOUT).

Figure 3:
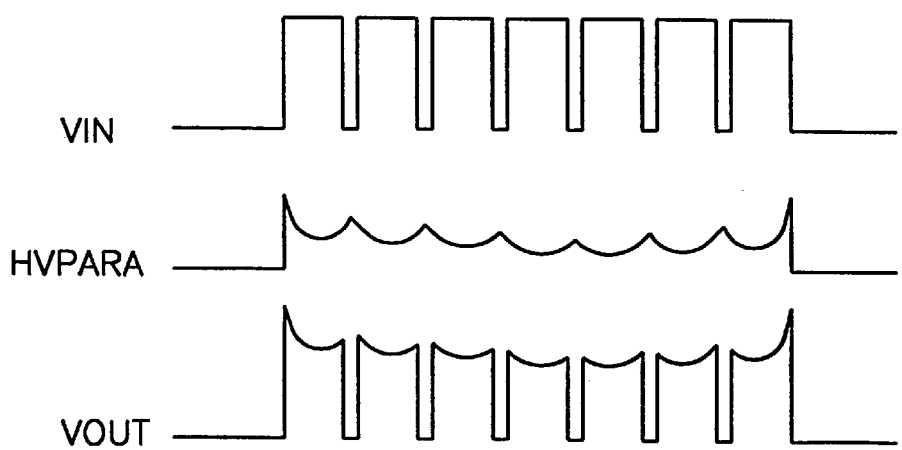
FIG. 3 is a schematic waveform of input and output signals of the brightness correcting circuit shown in FIG. 2.

FIG. 3 is a schematic waveform diagram of input and output signals of the brightness correcting circuit shown in FIG. 2. The change of the brightness of a screen according to the change of the parabolic signal (HVPARA) will be described in detail below.

Figure 4:
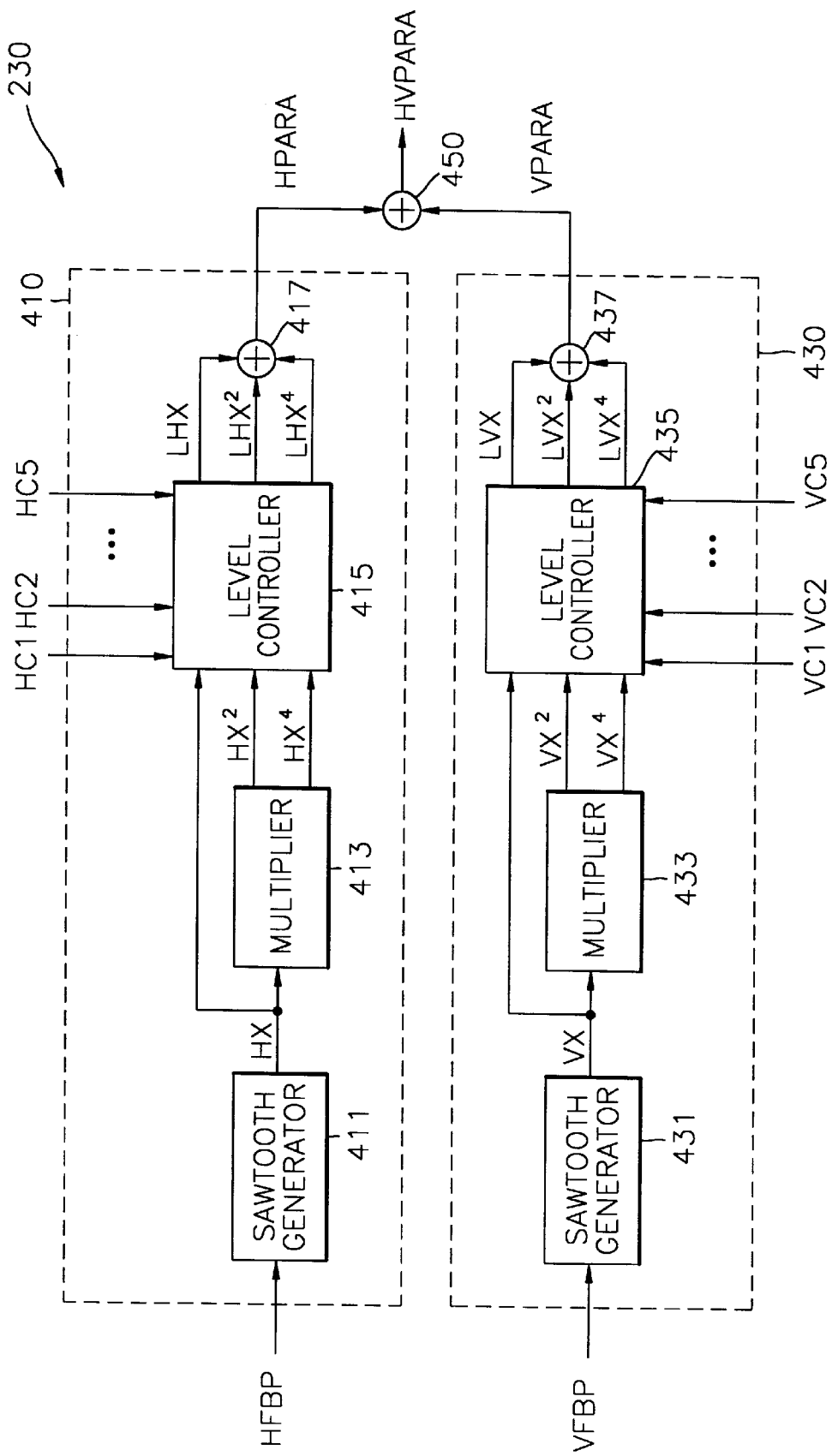
FIG. 4 is a block diagram showing one embodiment of a parabolic signal generator shown in FIG. 2.

FIG. 4 is a block diagram showing a preferred embodiment of the parabolic signal generator 230 shown in FIG. 2. Referring to FIG. 4, the parabolic signal generator 230 includes a horizontal parabolic signal generator 410, a vertical parabolic signal generator 430, and an adder 450.

The horizontal parabolic signal generator 410 generates a horizontal parabolic signal (HPARA), the waveform of which is variable in response to the control signals HC1 through HC5 among the plurality of control signals, using the horizontal flyback pulse (HFBP) as an input. The vertical parabolic signal generator 430 generates a vertical parabolic signal (VPARA), the waveform of which is variable in response to the control signals VC1 through VC5 among the plurality of control signals, using the vertical flyback pulse (VFBP) as an input. The adder 450 adds the horizontal parabolic signal (HPARA) to the vertical parabolic signal (VPARA) and outputs the addition result as the parabolic signal (HVPARA).

The horizontal parabolic signal generator 410 includes a sawtooth generator 411, a multiplier 413, a level controller 415, and an adder 417. The sawtooth generator 411 generates a first sawtooth signal HX which is a first degree function, using the horizontal flyback pulse (HFBP) as an input. The multiplier 413 generates the square signal $HX^2$ and the fourth power signal $HX^4$ of the first sawtooth signal, using the first sawtooth HX as an input. The level controller 415 controls the levels of the first sawtooth signal HX, the square signal $HX^2$ of the first sawtooth signal, and the fourth power signal $HX^4$ of the first sawtooth signal in response to the control signals HC1 through HC5, and outputs a level-controlled first sawtooth signal LHX, a level-controlled square signal $LHX^2$, and a level controlled fourth power signal $LHX^4$, the levels of which are controlled. The adder 417 adds the outputs of the level controller 415, i.e., the level-controlled first sawtooth LHX, the level-controlled square signal $LHX^2$, and the level-controlled fourth power signal $LHX^4$, to each other and outputs the addition result as the horizontal parabolic signal HPARA.

The vertical parabolic signal generator 430 has the same structure as that of the horizontal parabolic signal generator 410 and includes a sawtooth generator 431, a multiplier 433, a level controller 435, and an adder 437. The sawtooth generator 431 generates a second sawtooth signal VX which is a first degree function, using the vertical flyback pulse (VFBP) as an input. The multiplier 433 generates the square signal $VX^2$ and the fourth power signal $VX^4$ of the second sawtooth signal, using the second sawtooth signal VX as an input. The level controller 435 controls the levels of the second sawtooth signal VX, the square signal $VX^2$ of the second sawtooth signal, and the fourth power signal $VX^4$ of the second sawtooth signal in response to the control signals VC1 through VC5, and outputs a level-controlled second sawtooth signal LVX, a level-controlled square signal $LVX^2$ and a level-controlled fourth power signal $LVX^4$, the levels of which are controlled. The adder 437 adds the outputs of the level controller 435, i.e., the level-controlled second sawtooth signal LVX, the level-controlled square signal, $LVX^2$ and the level-controlled fourth power signal $LVX^4$, and outputs the addition result as the vertical parabolic signal VPARA.

Figure 5:
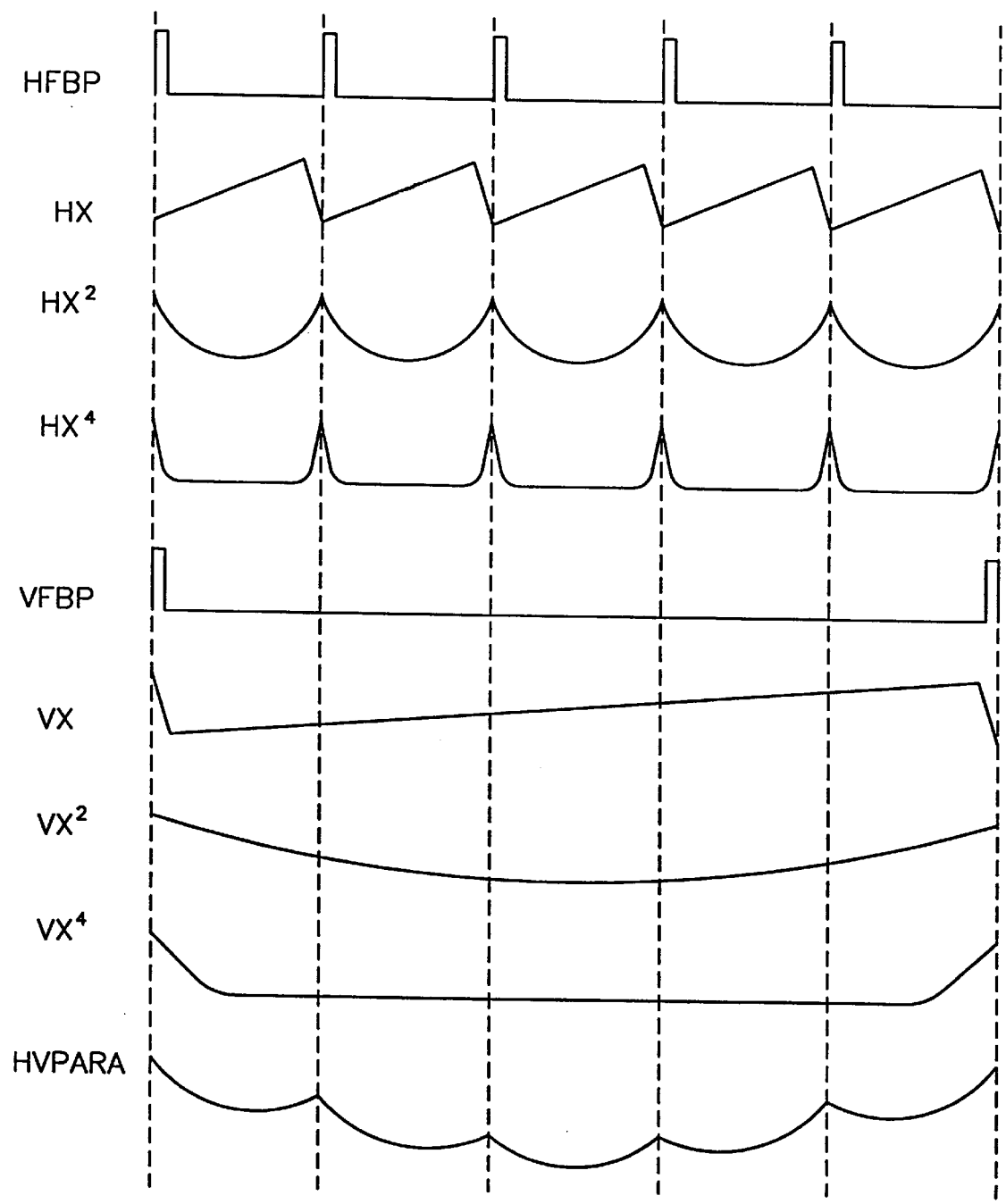
FIG. 5 is a waveform showing operations of the respective signals in the parabolic signal generator shown in FIG. 4.

FIG. 5 shows the waveforms of the respective signals in the parabolic signal generator 230 shown in FIG. 4. $HX^2$ and $VX^2$ are signals for correcting the brightness at the edge of the monitor screen in the horizontal and vertical directions. HX and VX are signals for letting a correction be performed even when the brightnesses of the left and right sides and the upper and lower sides of the monitor screen are not symmetrical by controlling the symmetry of $HX^2$ and $VX^2$, namely, by making the left and right sides and the upper and lower sides different in level on the basis of the middle values of $HX^2$ and $VX^2$. $HX^4$ and $VX^4$ are signals for correcting the brightness of the corners of the monitor screen.

Figure 6:
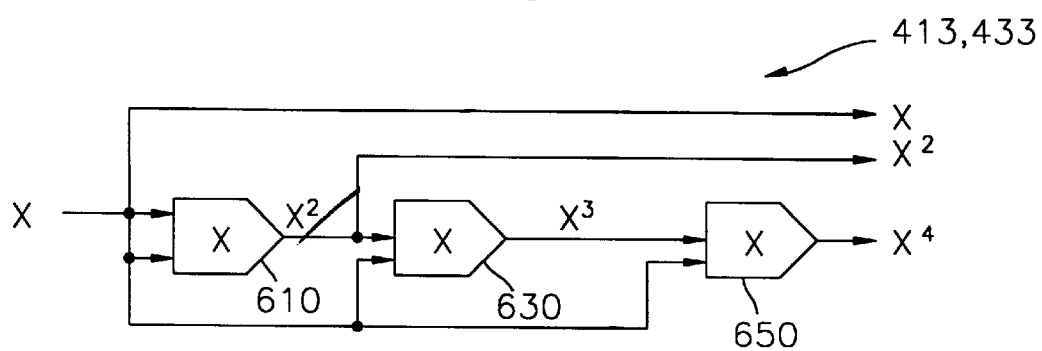
FIG. 6 is a detailed block diagram of one embodiment of a multiplier shown in FIG. 4.

FIG. 6 is a detailed block diagram of the multiplier 413, 433 shown in FIG. 4. The multiplier shown in FIG. 6 includes three multiplier circuits, i.e., first through third multipliers 610, 630, and 650. The first multiplier 610 multiplies two input signals X by each other to generate the square signal $X^2$ of the input signals. The second multiplier 630 multiplies the input signal X by the square signal $X^2$ to generate the third power signal $X^3$ of the input signal. The third multiplier 650 multiplies the input signal X by the third power signal $X^3$ to generate the fourth power signal $X^4$ of the input signal.

Figure 7:
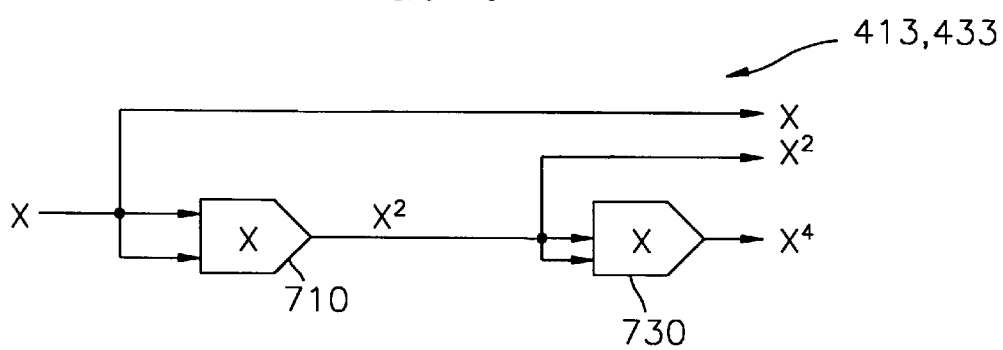
FIG. 7 is a detailed block diagram showing another embodiment of the multiplier shown in FIG. 4.

FIG. 7 is a detailed block diagram of another embodiment of the multiplier 413, 433 shown in FIG. 4. The multiplier shown in FIG. 7 includes two multiplier circuits, i.e., first and second multipliers 710 and 730. The first multiplier 710 multiplies two input signals X by each other to generate the square signal $X^2$ of the input signal. The second multiplier 730 multiplies the two square signals $X^2$ of the two input signals by each other to generate the fourth power signal $X^4$ of the input signal.

When the multiplier shown in FIG. 6 or FIG. 7 is used as the multiplier 413 of the horizontal parabolic signal generator 410 shown in FIG. 4, the first sawtooth signal HX, the square signal $HX^2$ of the first sawtooth signal, and the fourth power signal $HX^4$ of the first sawtooth signal respectively correspond to X, $X^2$, and $X^4$ of FIGS. 6 and 7. When the multiplier shown in FIG. 6 or FIG. 7 is used as the multiplier 433 of the vertical parabolic signal generator 430 shown in FIG. 4, the second sawtooth signal VX, the square signal $VX^2$ of the second sawtooth signal, and the fourth power signal $VX^4$ of the second sawtooth signal respectively correspond to X, $X^2$, and $X^4$ of FIGS. 6 and 7.

Figure 8:
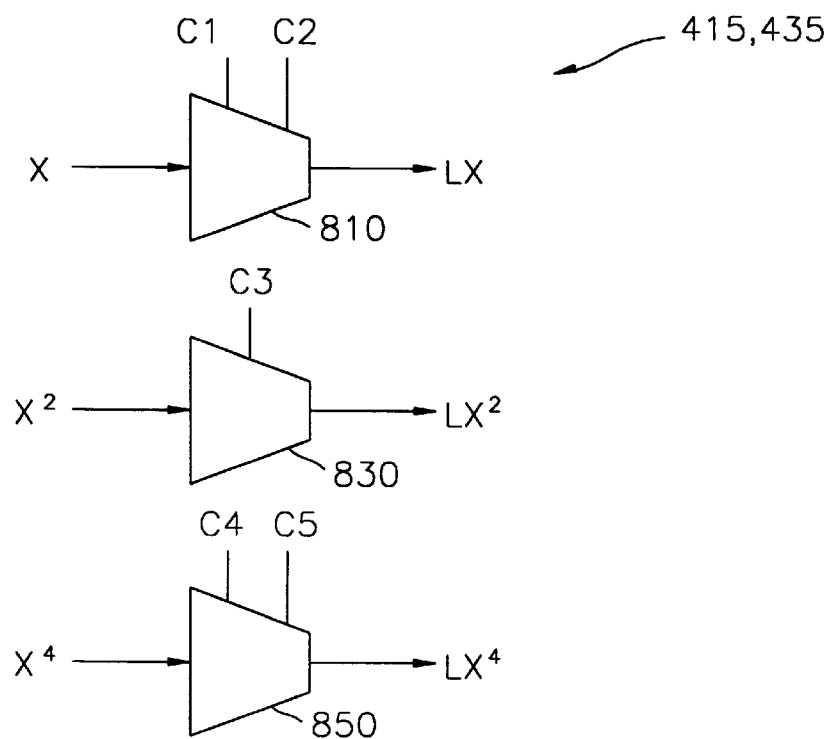
FIG. 8 is a detailed block diagram of one embodiment of a level controller shown in FIG. 4.

FIG. 8 is a detailed block diagram of a level controller 415, 435 shown in FIG. 4. Referring to FIG. 8, the level controller 415, 435 includes first through third level controllers 810, 830, and 850. The first level controller 810 controls the level of the input signal X in response to first and second control signals C1 and C2 and outputs an input signal LX, the level of which is controlled. The second level controller 830 controls the level of the square signal $X^2$ of the input signal in response to a third control signal C3 and outputs the square signal $LX^2$, the level of which is controlled. The third level controller 850 controls the level of the fourth power signal $X^4$ of the input signal in response to fourth and fifth control signals C4 and C5 and outputs the fourth power signal $LX^4$, the level of which is controlled.

Figure 9:
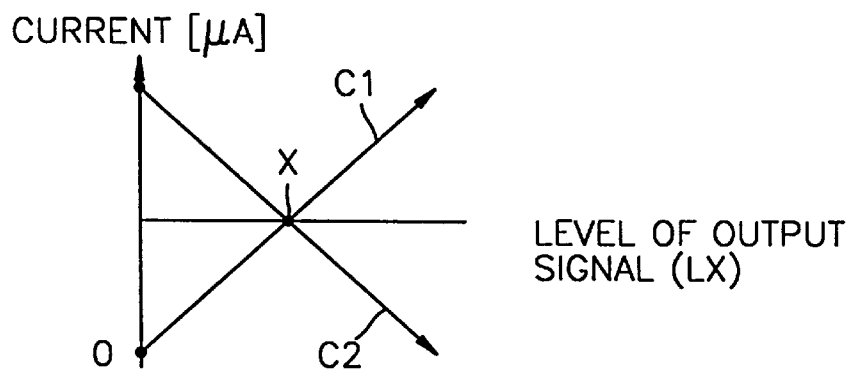
FIGS. 9 through 11 are current control characteristic graphs of first through third level controllers shown in FIG. 8.
Figure 10:
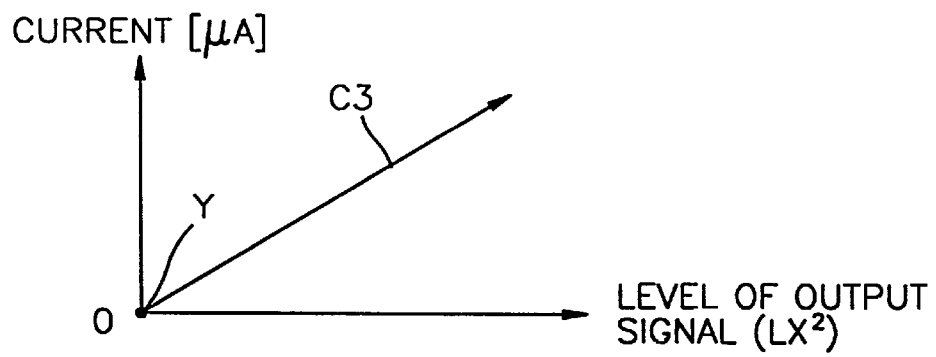
Figure 11:
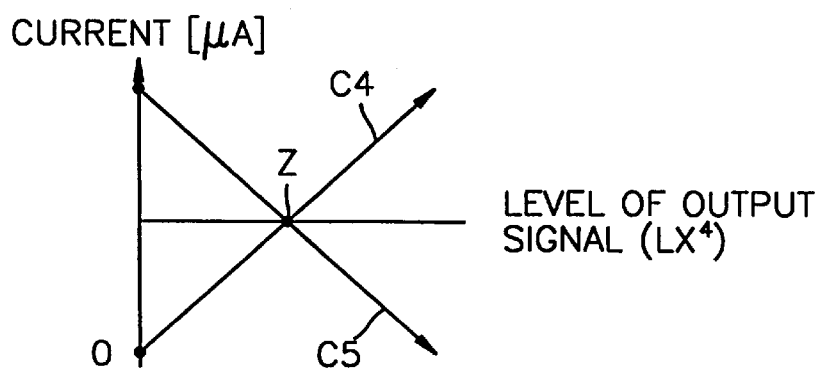

FIG. 9 is a current control characteristic graph of a first level controller 810 shown in FIG. 8. FIG. 10 is a current control characteristic graph of a second level controller 830 shown in FIG. 8. FIG. 11 is a current control characteristic graph of a third level controller 850 shown in FIG. 8.

Referring to FIG. 9, the level of the output signal LX of the first level controller 810 increases as the current of the first control signal C1 increases and the current of the second control signal C2 decreases. Here, the level of the output signal LX of the first level controller is "0" at the point marked X.

Referring to FIG. 10, the level of the output signal $LX^2$ of the second level controller 830 increases as the current of the third control signal C3 increases. The level of the output signal $LX^2$ of the second level controller is "O" at the point marked Y.

Referring to FIG. 11, the level of the output signal $LX^4$ of the third level controller 850 increases as the current of the fourth control signal C4 increases and the current of the fifth control signal C5 decreases. The level of the output signal $LX^4$ of the third level controller is "O" at the point marked Z.

Figure 12:
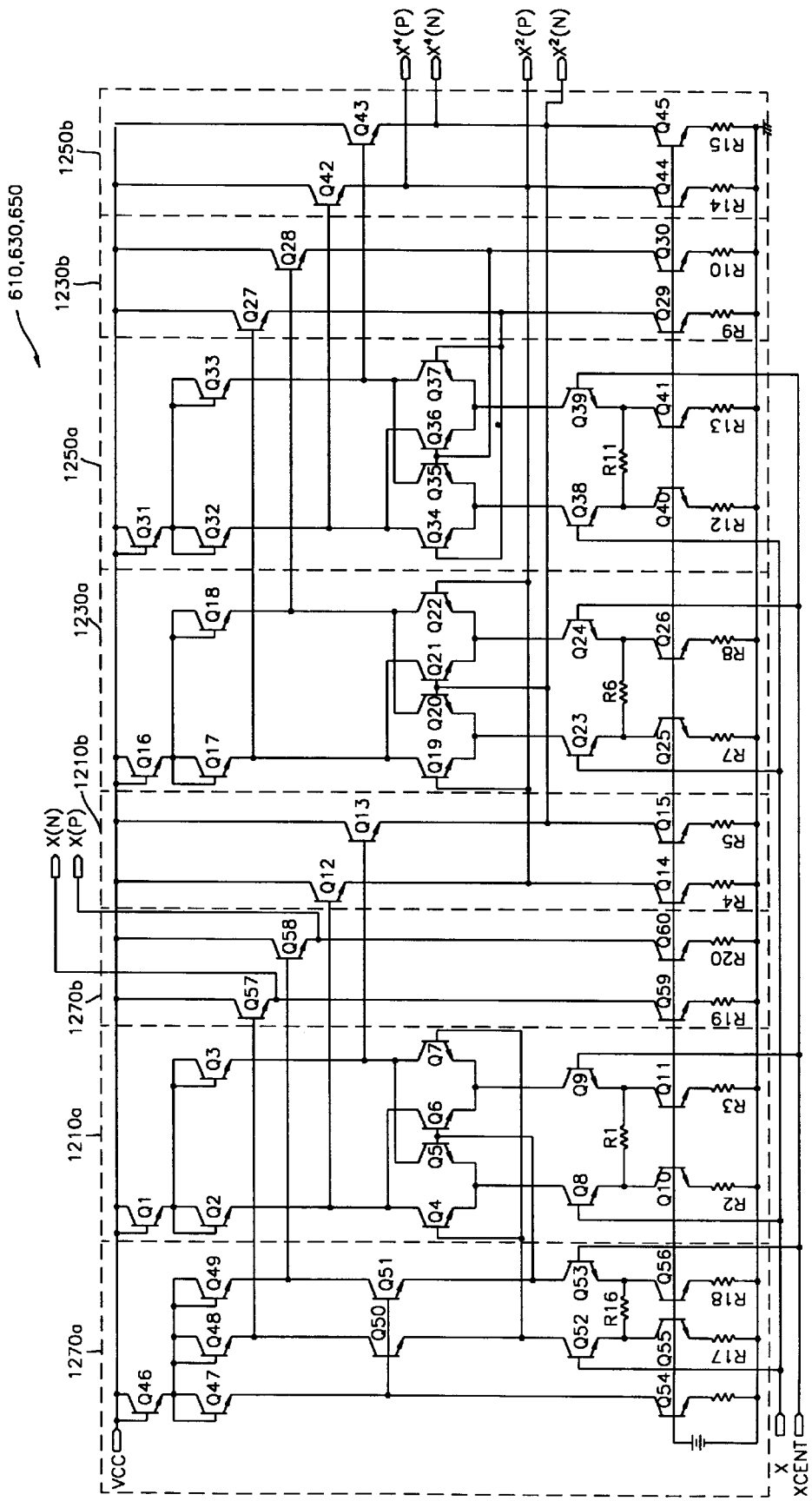
FIG. 12 is a detailed circuit diagram of the multiplier shown in FIG. 6.

FIG. 12 is a detailed circuit diagram of a multiplier shown in FIG. 6. Referring to FIG. 12, a first multiplier 610 shown in FIG. 6 is comprised of a first multiplying block 1210a and a buffer block 1210b. The first multiplying block 1210a is comprised of transistors Q1 through Q11 and resistors R1 through R3. The first buffer block 1210b is comprised of transistors Q12 through Q15 and resistors R4 through R5.

A second multiplier 630 shown in FIG. 6 is comprised of a second multiplying block 1230a and a second buffer block 1230b. The second multiplying block 1230a is comprised of transistors Q16 through Q26 and resistors R6 through R8. The second buffer block 1230b is comprised of transistors Q27 through Q30 and resistors R9 and RIO.

Also, a third multiplier 650 shown in FIG. 6 is comprised of a third multiplying block 1250a and a third buffer block 1250b. The third multiplying block 1250a is comprised of transistors Q31 through Q41 and resistors R11 through R13. The third buffer block 1250b is comprised of transistors Q42 through Q45 and resistors R14 and R15.

A block 1270a and a buffer block 1270b are for widening the dynamic ranges of HX and VX of FIG. 4. The output signals X(P) and X(N) of the buffer block 1270b are applied to the level controller shown in FIG. 4.

Figure 13:
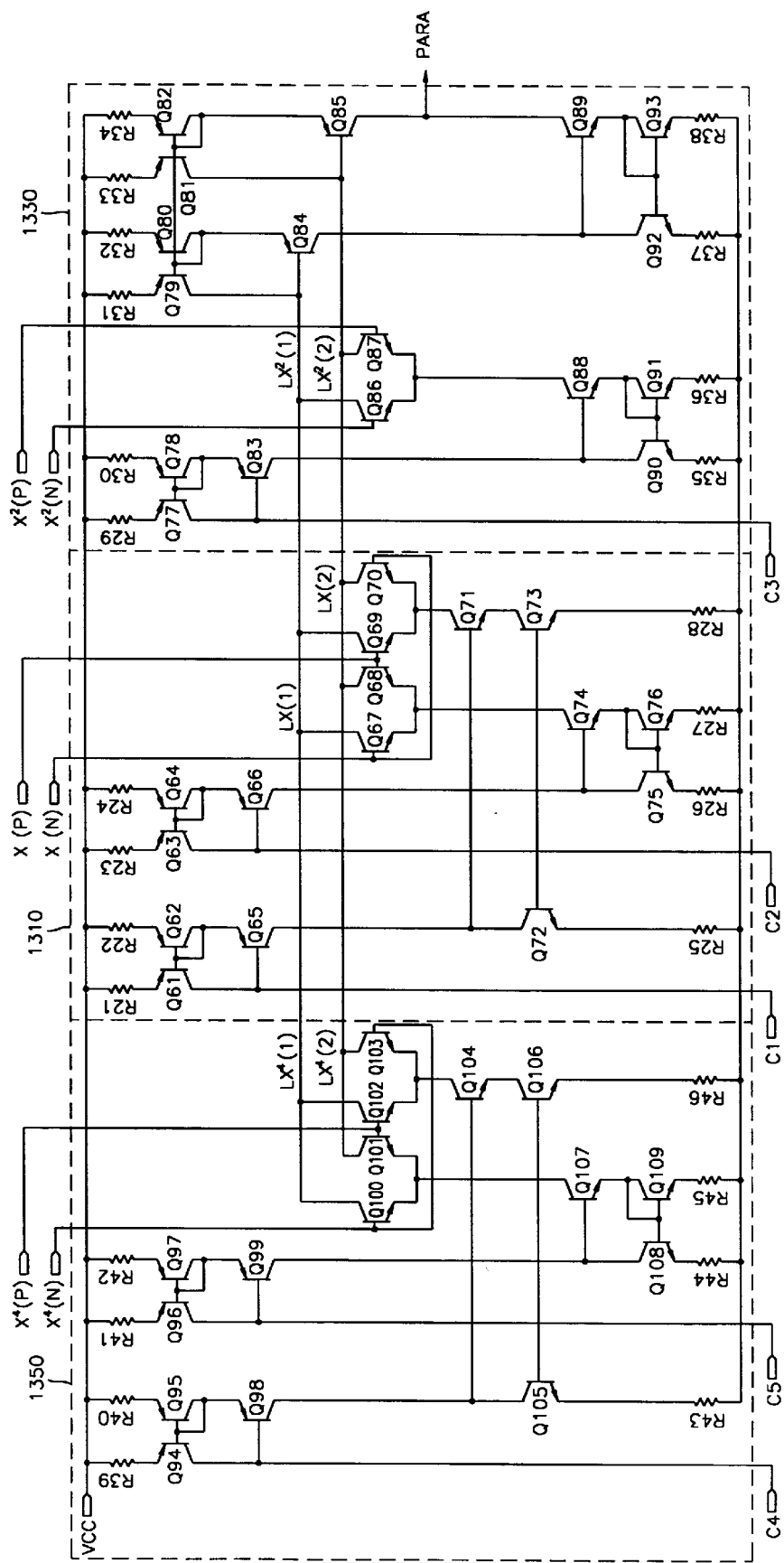
FIG. 13 is a detailed circuit diagram of the level controller shown in FIG. 8.

FIG. 13 is a detailed circuit diagram of a level controller shown in FIG. 8. Referring to FIG. 13, a block 1310 corresponding to the first level controller 810 shown in FIG. 8 is comprised of transistors Q61 through Q76 and resistors R21 through R28. A block 1330 corresponding to the second level controller 830 shown in FIG. 8 is comprised of transistors Q77 through Q93 and resistors R29 through R38.

A block 1350 corresponding to the third level controller 850 shown in FIG. 8 is comprised of transistors Q94 through Q109 and resistors R39 through R46.

The change of a waveform when the level of the respective signals are selectively controlled by the parabolic signal generator shown in FIG. 4 and the change of the brightness of a screen according to the change of the waveform will be described in detail with reference to FIGS. 14 through 17.

Figure 14:
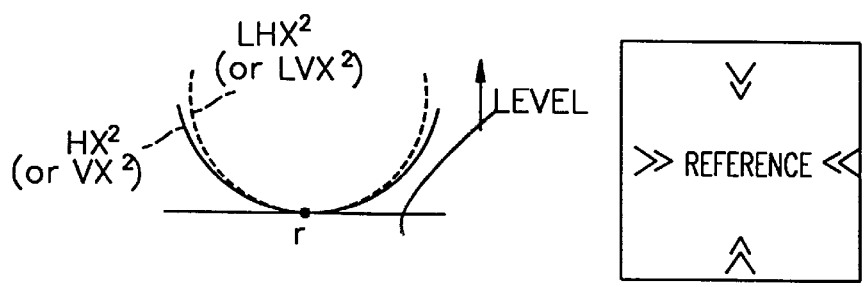
FIG. 14 shows the change of a waveform diagram when the level of the square signal $HX^2$ of a first sawtooth and the level of the square signal $VX^2$ of a second sawtooth are controlled in the parabolic signal generator shown in FIG. 4, and the change of the brightness of the screen according to the change of the waveform.

FIG. 14 shows the change of a waveform when the level of the square signal $HX^2$ of the first sawtooth signal and the level of the square signal $VX^2$ of the second sawtooth signal are controlled by the parabolic signal generator shown in FIG. 4 and the change of the brightness of a screen according to the change of the waveform. Here, the signals $VX^2$ and $LVX^2$ of the vertical parabolic signal generator are described to have the same patterns of waveforms as the signals $HX^2$ and $LHX^2$ of the horizontal parabolic signal generator for simplicity.

Referring to FIG. 14, when the current of the third control signal HC3 of a level controller 415 is increased by the horizontal parabolic signal generator 410 shown in FIG. 4, the level of $LHX^2$ is higher than the level of $HX^2$ at the edge of a screen centering around a reference point (r). As mentioned above, $HX^2$ and $LHX^2$ are signals for correcting the brightness of the edge of the horizontal direction of the screen, which are basic waves of the horizontal parabolic signal HPARA. Therefore, the screen becomes brighter at the edge in a horizontal direction than in the reference thereof, i.e., the center thereof.

Figure 15:
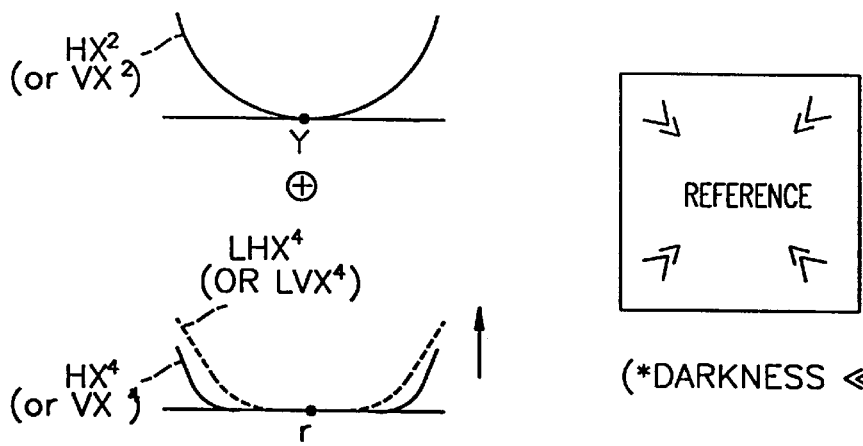
FIG. 15 shows the change of a waveform diagram when the level of the fourth power signal $HX^4$ of a first sawtooth and the level of the fourth power signal $VX^4$ of a second sawtooth are controlled in the parabolic signal generator shown in FIG. 4, and the change of the brightness of the screen according to the change of the waveform.

FIG. 15 shows the change of the waveform when the level of the fourth power signal $HX^4$ of the first sawtooth signal and the level of the fourth power signal $VX^4$ of the second sawtooth signal are controlled by the parabolic signal generator shown in FIG. 4 and the change of the brightness of a screen according to the change of the waveform. Here, the signals $VX^2$, $VX^4$, and $LVX^4$ of the vertical parabolic signal generator are described to have the same patterns of waveforms as the signals $HX^2$, $HX^4$, and $LHX^4$ of the horizontal parabolic signal generator for simplicity.

Referring to FIG. 15, when the current of the fourth control signal HC4 of the level controller 415 is increased and the current of the fifth control signal HC5 is decreased by the horizontal parabolic signal generator 410 shown in FIG. 4, the level of $LHX^4$ is higher than the level of $HX^4$ at the edge of the screen centering around the reference point (r). Also, when the current of the fourth control signal VC4 of the level controller 435 is increased and the current of the fifth control signal VC5 is decreased by the vertical parabolic signal generator 430 shown in FIG. 4, the level of $LVX^4$ is higher than the level of $VX^4$ at the edge centering around the reference point (r) of the screen. $HX^4$ and $LHX^4$ and $VX^4$ and $LVX^4$, which are signals for correcting the brightness of the corners of the screen, correct the parts which are not corrected by $HX^2$ and $VX^2$. Therefore, the screen is brighter in the corners thereof than in the center thereof.

Figure 16:
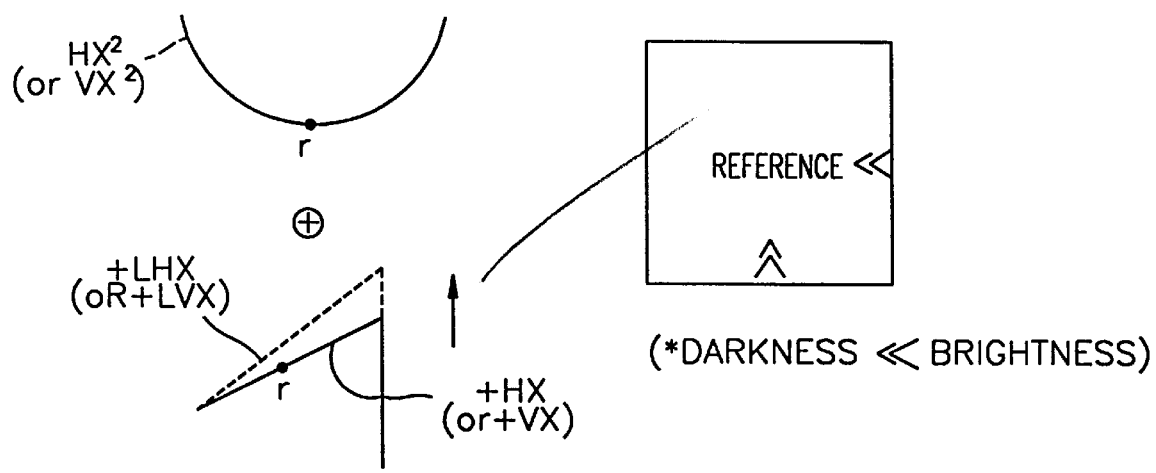
FIG. 16 shows the change of a waveform diagram when the level of the first sawtooth +HX and the level of the second sawtooth (+VX) are controlled in the parabolic signal generator shown in FIG. 4, and the change of the brightness of the screen according to the change of the waveform.

FIG. 16 shows the change of the waveform when the level of the first sawtooth signal +HX and the level of the second sawtooth +VX are controlled by the parabolic signal generator shown in FIG. 4 and the change of the brightness of the screen according to the change of the waveforn. Here, the signals $VX^2$, VX, and LVX of the vertical parabolic signal generator are described to have the same patterns of waveforms as the signals $HX^2$, HX, and LHX of the horizontal parabolic signal generator for simplicity.

Referring to FIG. 16, when the current of the first control signal HCl is increased and the current of the second control signal HC2 is decreased by the horizontal parabolic signal generator 410 shown in FIG. 4, the level of +LHX is higher than the level of +HX at the right edge of the screen. HX is a signal for letting a correction be performed even when the brightness of the left and right sides of the monitor screen is not symmetrical by controlling the symmetry of $HX^2$, namely, by making the left and right sides different in level on the basis of the middle value of $HX^2$. Therefore, the right edge of the screen is brighter than the center of the screen.

When the current of the first control signal VC1 of the level controller 435 is increased and the current of the second control signal VC2 of the level controller 435 is decreased by the vertical parabolic signal generator 430 shown in FIG. 4, the level of +LVX is higher than the level of +VX at the right edge of the screen. VX is a signal for letting a correction be performed even when the brightness of the upper and lower sides of the monitor screen is not symmetrical by controlling the symmetry of $VX^2$, namely, by making the left and right sides different in level on the basis of the middle value of $VX^2$. Therefore, the screen is brighter at the lower edge thereof than the center thereof.

Figure 17:
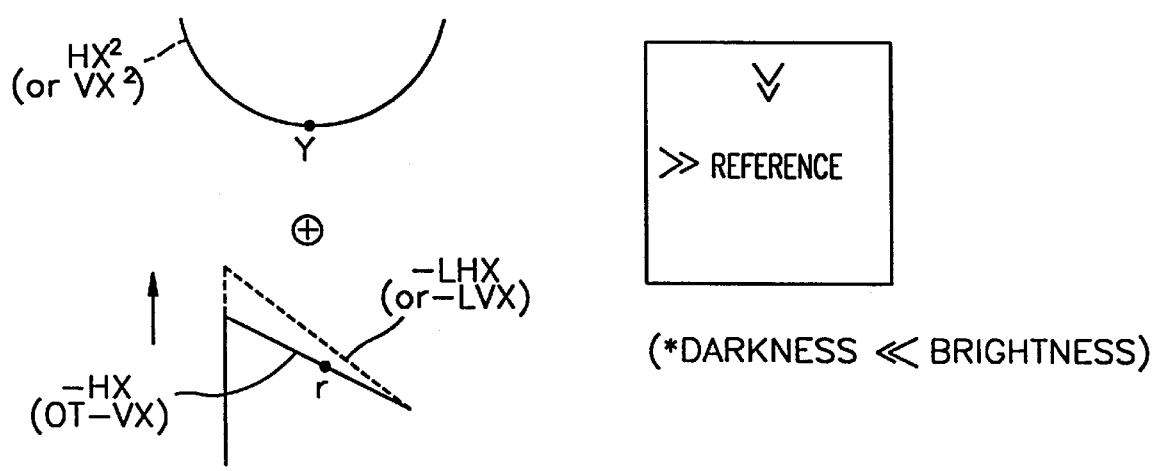
FIG. 17 shows the change of a waveform diagram when the level of the inverted signal (−HX) of the first sawtooth and the level of the inverted signal (−VX) of the second sawtooth are controlled in the parabolic signal generator shown in FIG. 4, and the change of the brightness of the screen according to the change of the waveform.

FIG. 17 shows the change of the waveform when the level of the inverted signal –HX of the first sawtooth signal and the level of the inverted signal –VX of the second sawtooth signal are controlled by the parabolic signal generator shown in FIG. 4 and the change of the brightness of the screen according to the change of the waveform. Here, the signals $VX^2$, –VX, and –LVX of the vertical parabolic signal generator are described to have the same patterns of waveforms as the signals $HX^2$, –HX, and –LHX of the horizontal parabolic signal generator for simplicity.

Referring to FIG. 17, when the current of the first control signal HC1 of the level controller 415 is decreased and the current of the second control signal HC2 of the level controller 415 is increased by the horizontal parabolic signal generator 410 shown in FIG. 4, the level of –LHX is higher than the level of –HX at the left edge of the screen. Therefore, the screen is brighter at the left edge thereof than the center thereof.

As mentioned above, according to the circuit for correcting the brightness of a monitor and a method for correcting the brightness according to the present invention, it is possible to efficiently correct the edges and the corners of the monitor screen by varying the waveform of the parabolic signal by selectively controlling the current of the control signals of the parabolic signal generator.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. A circuit for correcting the brightness of a monitor screen, comprising:
   a parabolic signal generator for generating a parabolic signal; and
   a corrected video signal generator for controlling the gain of an input video signal in response to the parabolic signal and outputting a corrected video signal,
   wherein the parabolic signal generator comprises:
   a horizontal parabolic signal generator for generating a horizontal parabolic signal, the waveform of which is variable in response to a plurality of control signals, using a horizontal flyback pulse as an input;
   a vertical parabolic signal generator for generating a vertical parabolic signal, the waveform of which is variable in response to other plurality of control signals, using a vertical flyback pulse as an input; and an adder for adding the horizontal parabolic signal to the vertical parabolic signal and outputting the addition result as the parabolic signal; wherein the horizontal parabolic signal generator comprises:

a sawtooth generator for generating a first sawtooth signal using the horizontal flyback pulse as an input, a multiplier for generating a square signal and a fourth power signal of the first sawtooth signal using the first sawtooth signal as an input, a level controller for controlling the levels of the first sawtooth signal, the square signal, and the fourth power signal in response to the plurality of control signals and outputting the level-controlled first sawtooth signal, the level-controlled square signal and the level-controlled fourth power signal and an adder for adding the level-controlled first sawtooth signal, the level-controlled square signal, and the level-controlled fourth power signal to one another and outputting the addition result as the horizontal parabolic signal.

2. The circuit of claim 1, wherein the multiplier comprises:

a first multiplier for multiplying the first saw tooth signal by itself to generate the square signal;

a second multiplier for multiplying the first sawtooth signal by the square signal to generate a third power signal; and a third multiplier for multiplying the first sawtooth signal by the third power signal to generate the fourth power signal.

3. The circuit of claim 1, wherein the multiplier comprises:

a first multiplier for multiplying the first sawtooth signal by itself to generate the square signal; and a second multiplier for multiplying the square signal by itself to generate the fourth power signal.

4. The circuit of claim 1, wherein the level controller comprises:

a first level controller for controlling the level of the first sawtooth signal in response to first and second control signals among the plurality of control signals and outputting the level-controlled first sawtooth signal;

a second level controller for controlling the level of the square signal in response to a third control signal among the plurality of control signals and outputting the level-controlled square signal; and a third level controller for controlling the level of the fourth power signal in response to fourth and fifth control signals among the plurality of control signals and outputting the level-controlled fourth power signal.

5. The circuit of claim 4, wherein the level of the output signal of the first level controller is increased when the current of the first control signal is increased and the current of the second control signal is decreased.

6. The circuit of claim 4, wherein the level of the output signal of the second level controller is increased when the current of the third control signal is increased.

7. The circuit of claim 4, wherein the level of the output signal of the third level controller is increased when the current of the fourth control signal is increased and the current of the fifth control signal is decreased.

8. The circuit of claim 1, wherein the vertical parabolic signal generator comprises:

a sawtooth generator for generating a second sawtooth signal using the vertical flyback pulse as an input;

a multiplier for generating a square signal and a fourth power signal of the second sawtooth signal using the second sawtooth signal as an input;

a level controller for controlling the levels of the second sawtooth signal, the square signal of the second sawtooth signal, and the fourth power signal of the second sawtooth signal in response to another plurality of control signals and outputting the level-controlled second sawtooth signal, the level-controlled square signal of the second sawtooth signal and the level-controlled fourth power signal of the second sawtooth signal; and an adder for adding the level-controlled second sawtooth signal, the level-controlled square signal, and the level-controlled fourth power signal to one another and outputting the addition result as the vertical parabolic signal.

9. The circuit of claim 8, wherein the multiplier comprises:

a first multiplier for multiplying the second sawtooth signal by itself to generate the square signal;

a second multiplier for multiplying the second sawtooth signal by the square signal to generate a third power signal; and a third multiplier for multiplying the second sawtooth signal by the third power signal to generate the fourth power signal.

10. The circuit of claim 8, wherein the multiplier comprises:

a first multiplier for multiplying the second sawtooth signal by itself to generate the square signal; and a second multiplier for multiplying the square signal by itself to generate the fourth power signal.

11. The circuit of claim 8, wherein the level controller comprises:

a first level controller for controlling the level of the second sawtooth signal in response to first and second control signals among the other plurality of control signals and outputting the level-controlled second sawtooth signal;

a second level controller for controlling the level of the square signal in response to a third control signal among the other plurality of control signals and outputting the level-controlled square signal; and a third level controller for controlling the level of the fourth power signal in response to fourth and fifth control signals among the other plurality of control signals and outputting the level-controlled fourth power signal.

12. The circuit of claim 11, wherein the level of the output signal of the first level controller is increased when the current of the first control signal is increased and the current of the second control signal is decreased.

13. The circuit of claim 11, wherein the level of the output signal of the second level controller is increased when the current of the third control signal is increased.

14. The circuit of claim 11, wherein the level of the output signal of the third level controller is increased when the current of the fourth control signal is increased and the current of the fifth control signal is decreased.

15. A parabolic signal generator, comprising:

a sawtooth generator for generating a sawtooth signal using a pulse signal as an input;

a multiplier for generating a square signal and a fourth power signal of the sawtooth signal using the sawtooth signal as an input;

a level controller for controlling the levels of the sawtooth signal, the square signal, and the fourth power signal in response to a plurality of control signals and outputting the level-controlled sawtooth signal, the level-controlled square signal and the level-controlled fourth power signal; and an adder for adding the level-controlled sawtooth signal, the level-controlled square signal, and the level-controlled fourth power signal to one another and outputting the addition result as a parabolic signal; wherein the multiplier comprises:

a first multiplier for multiplying the sawtooth signal by itself to generate the square signal a second multiplier for multiplying the sawtooth signal by the square signal to generate a third power signal, and a third multiplier for multiplying the sawtooth signal by the third power signal to generate the fourth power signal.

16. The parabolic signal generator of claim 15, wherein the multiplier comprises:

a first multiplier for multiplying the sawtooth signal by itself to generate the square signal; and a second multiplier for multiplying the square signal by itself to generate the fourth power signal.

17. The parabolic signal generator of claim 15, wherein the level controller comprises:

a first level controller for controlling the level of the sawtooth signal in response to first and second control signals among the plurality of control signals and outputting the level-controlled sawtooth signal;

a second level controller for controlling the level of the square signal in response to a third control signal among the plurality of control signals and outputting the level-controlled square signal; and a third level controller for controlling the level of the fourth power signal in response to fourth and fifth control signals among the plurality of control signals and outputting the level-controlled fourth power signal.

18. The parabolic signal generator of claim 15, wherein the level of the output signal of the first level controller is increased when the current of the first control signal is increased and the current of the second control signal is decreased.

19. The parabolic signal generator of claim 15, wherein the level of the output signal of the second level controller is increased when the current of the third control signal is increased.

20. The parabolic signal generator of claim 15, wherein the level of the output signal of the third level controller is increased when the current of the fourth control signal is increased and the current of the fifth control signal is decreased.

21. A method for correcting the brightness of a monitor screen, comprising the steps of:

(a) generating a first sawtooth signal using a horizontal flyback pulse as an input;

(b) generating a square signal and a fourth power signal of the first sawtooth signal using the first sawtooth signal as an input;

(c) controlling the levels of the first sawtooth signal, the square signal of the first sawtooth signal, and the fourth power signal of the first sawtooth signal in response to a plurality of control signals;

(d) adding the level-controlled first sawtooth signal, the level-controlled square signal of the first sawtooth signal, and the level-controlled fourth power signal of the first sawtooth signal to each other and outputting the result as a horizontal parabolic signal;

(e) generating a second sawtooth signal using a vertical flyback pulse as an input;

(f) generating a square signal and a fourth power signal of the second sawtooth signal using the second sawtooth as an input;

(g) controlling the levels of the second sawtooth signal, the square signal of the second sawtooth signal, and the fourth power signal of the second sawtooth signal in response to another plurality of control signals;

(h) adding the level-controlled second sawtooth signal, the level-controlled square signal of the second sawtooth signal and the level-controlled fourth power signal of the second sawtooth signal to one another and outputting the addition result as a vertical parabolic signal;

(i) adding the horizontal parabolic signal to the vertical parabolic signal and outputting the addition result as a parabolic signal; and (j) controlling the gain of an input video signal in response to the parabolic signal and outputting a corrected video signal.

22. The method of claim 21, wherein step (b) comprises the steps of:

generating the square signal by multiplying the first sawtooth signal by itself;

generating a third power signal by multiplying the first sawtooth signal by the square signal; and generating the fourth power signal by multiplying the first sawtooth signal by the third power signal.

23. The method of claim 21, wherein step (b) comprises the steps of:

generating the square signal by multiplying the first sawtooth signal by itself; and generating the fourth power signal by multiplying the square signal by itself.

24. The method of claim 21, wherein the step (c) comprises the steps of:

controlling the level of the first sawtooth signal in response to first and second control signals among the plurality of control signals;

controlling the level of the square signal in response to a third control signal among the plurality of control signals; and controlling the level of the fourth power signal in response to fourth and fifth control signals among the plurality of control signals.

25. The method of claim 24, wherein the level of the first sawtooth signal is increased when the current of the first control signal is increased and the current of the second control signal is decreased.

26. The method of claim 24, wherein the level of the square signal is increased when the current of the third control signal is increased.

27. The method of claim 24, wherein the level of the fourth power signal is increased when the current of the fourth control signal is increased and the current of the fifth control signal is decreased.

28. The method of claim 21, wherein step (f) comprises the steps of:

generating the square signal by multiplying the second sawtooth signal by itself;

generating a third power signal by multiplying the second sawtooth signal by the square signal; and the fourth power signal by multiplying the second sawtooth signal by the third power signal.

29. The method of claim 21, wherein step (f) comprises the steps of:

generating the square signal by multiplying the second sawtooth signal by itself; and generating the fourth power signal by multiplying the square signal by itself.

30. The method of claim 21, wherein the step (g) comprises the steps of:

controlling the level of the second sawtooth signal in response to first and second control signals among the other plurality of control signals;

controlling the level of the square signal in response to a third control signal among the other plurality of control signals; and controlling the level of the fourth power signal in response to fourth and fifth control signals among the other plurality of control signals.

31. The method of claim 30, wherein the level of the second sawtooth signal is increased when the current of the first control signal is increased and the current of the second control signal is decreased.

32. The method of claim 30, wherein the level of the square signal is increased when the current of the third control signal is increased.

33. The method of claim 30, wherein the level of the fourth power signal is increased when the current of the fourth control signal is increased and the current of the fifth control signal is decreased.

34. A parabolic signal generator, comprising:

a sawtooth generator for generating a sawtooth signal using a pulse signal as an input;

a multiplier for generating a square signal and a fourth power signal of the sawtooth signal using the sawtooth signal as an input;

a level controller for controlling the levels of the sawtooth signal the square signal, and the fourth power signal in response to a plurality of control signals and outputting the level-controlled sawtooth signal, the level-controlled square signal and the level-controlled fourth power signal; and an adder for adding the level-controlled sawtooth signal, the level-controlled square signal, and the level-controlled fourth power signal to one another and outputting the addition result as a parabolic signal; wherein the multiplier comprises:

a first multiplier for multiplying the sawtooth signal by itself to generate the square signal, and a second multiplier for multiplying the square signal by itself to generate the fourth power signal.

35. A parabolic signal generator, comprising:

a sawtooth generator for generating a sawtooth signal using a pulse signal as an input;

a multiplier for generating a square signal and a fourth power signal of the sawtooth signal using the sawtooth signal as an input;

a level controller for controlling the levels of the sawtooth signal, the square signal, and the fourth power signal in response to a plurality of control signals and outputting the level-controlled sawtooth signal, the level-controlled square signal and the level-controlled fourth power signal; and an adder for adding the level-controlled sawtooth signal, the level-controlled square signal, and the level-controlled fourth power signal to one another and outputting the addition result as a parabolic signal; wherein the level controller comprises:

a first level controller for controlling the level of the sawtooth signal in response to first and second control signals among the plurality of control signals and outputting the level-controlled sawtooth signal, a second level controller for controlling the level of the square signal in response to a third control signal among the plurality of control signals and outputting the level-controlled square signal, and a third level controller for controlling the level of the fourth power signal in response to fourth and fifth control signals among the plurality of control signals and outputting the level-controlled fourth power signal.

* * * * *

UNITED STATES PATENT AND TRADEMARK OFFICE
CERTIFICATE OF CORRECTION

PATENT NO.     : 6,246,445 B1
DATED          : June 12, 2001
INVENTOR(S)    : Hyeok-chul Kwon It is certified that error appears in the above-identified patent and that said Letters Patent is hereby corrected as shown below:

Column 9,
Line 17, please insert a comma after "signal".

Column 11,
Lines 40, 45 and 49, please change "15" to -- 17 --.

Column 13,
Line 42, please insert a comma after "signal" and before the first occurrence of "the".

Signed and Sealed this

Twenty-second Day of July, 2003

JAMES E. ROGAN
*Director of the United States Patent and Trademark Office*